United States Patent [19]

Furr

[11] Patent Number: 5,077,907

[45] Date of Patent: Jan. 7, 1992

[54] PIPE MEASURING APPARATUS

[76] Inventor: Bob G. Furr, 3871 Fairway Dr., Cameron Park, Calif. 95682

[21] Appl. No.: 712,349

[22] Filed: Jun. 7, 1991

[51] Int. Cl.⁵ .............................................. G01B 5/00
[52] U.S. Cl. ...................................... 33/529; 33/770; 33/759; 33/392
[58] Field of Search ................. 33/770, 755, 759, 760, 33/768, 529, 392; 248/49, 52, 65, 67.7

[56] References Cited

U.S. PATENT DOCUMENTS

| | | | |
|---|---|---|---|
| 856,938 | 6/1907 | Beller | 33/770 |
| 2,544,908 | 3/1951 | Winston | 33/759 |
| 2,629,934 | 3/3953 | Scott | 33/770 |
| 3,016,617 | 1/1961 | Bricker | 33/759 |
| 4,367,593 | 1/1983 | Whitworth | 33/529 |

FOREIGN PATENT DOCUMENTS

| | | | |
|---|---|---|---|
| 2397620 | 9/1972 | France . | |
| 02-37778 | 9/1990 | Japan | 33/529 |
| 2181244 | 4/1987 | United Kingdom | 33/759 |

OTHER PUBLICATIONS

Article, "The Real Estate Appraiser & Analyst", Fall 1989.

*Primary Examiner*—William A. Cuchlinski, Jr.
*Assistant Examiner*—Alvin Wirthlin
*Attorney, Agent, or Firm*—John P. O'Banion

[57] ABSTRACT

An apparatus for measuring pipe or conduit which temporarily secures one end of a tape measure to an end of a pipe or conduit. The apparatus includes a main body (10) body secured in place by means of a finger operated lock mechanism (60). A bracket (44) with a slot (46) for receiving one end of a measuring tape (66) is attached to one end of a rod (38), the other end of the rod being inserted into a receptacle (36) on an adjustable support arm (30). The adjustable support arm (30) is inserted into one of several measurement ports in main body (10) and is positioned for taking a measurement along the length of the pipe or conduit, or along an axis perpendicular to the longitudinal axis running between the ends of the pipe or conduit, or in any other direction away from the pipe or conduit.

20 Claims, 5 Drawing Sheets

PIPE MEASURING APPARATUS

BACKGROUND OF THE INVENTION

1. Field of the Invention

This invention pertains generally to pipe measuring devices, and more specifically to an apparatus for temporary attachment of a measuring tape to a pipe or coupling for taking measurements from any direction.

2. Description of the Background Art

When installing runs of pipe or conduit, it is desirable to have accurate measurements before cutting the pipe to length and either terminating the end of the pipe or installing a coupling. Electricians find accurate measurements extremely important when installing conduit where one end must land in a coupling or termination box. Proper measurement before cutting guards against waste, improper fitting, and lost work time. To facilitate quick and accurate measurements to be taken it has been, and currently is, the practice of many pipe and conduit installers to have an assistant hold the end of a tape measure at one end of the pipe while the installer himself extends the tape measure and marks the pipe at the point where a cut is to be made. Use of an assistant, however, increases the cost of installation. As a result, several solutions have been proposed for attaching the end of a tape measure to a pipe, thereby eliminating the need for an assistant.

For example, French No. 2,397,620 issued to Duchene on Sept. 2, 1979, discloses a device which permits a tape to be inserted into a pipe and which has a measurement index on the tape which remains in place when the tape is removed. U.S. Pat. No. 2,544,908 issued to Winston on Mar. 13, 1951, discloses a tape measure spool in combination with an arcuate-shaped apparatus for attachment of the tape measure to the end of a length of pipe. U.S Pat. No. 3,106,617 issued to Bricker on Jan. 16, 1962, discloses a "U-shaped" device which fits into the thread protecting cap on the end of a pipe, and which has a hook for attachment of a tape measure. U.S. Pat. No. 2,629,934 issued to Scott on Mar. 3, 1953, discloses a hook-shaped device for straddling the end of a pipe, and which is adapted at one end for receiving and holding the end of a tape measure. U.S. Pat. No. 856,938 issued to Beller on June 11, 1907, discloses an anchor for attachment to the end of a tape measure, the anchor securing the tape measure to the edge of a fixture. Finally, an article from "*The Real Estate Appraiser & Analyst*" dated Fall 1989, discloses a device using an ell-shaped bracket adapted as an anchor for attachment to the end of a tape measure.

The foregoing devices are deficient in one or more important respects. Some are bulky and not well suited for use with small diameter pipes, and do not fit into a small tool box or the installer's pocket for easy field use. Others require a coupling or end cap to be installed on the pipe so that the device can be secured to the pipe. Still others are not adaptable for attachment to pipes of varying diameters. Finally, none of the devices disclosed permit the installer to easily change the direction of measurement.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention generally comprises a device which fits over the end of a pipe, conduit, or pipe or conduit coupling, and which is adapted for temporary attachment of a measuring means such as one end of a measuring tape or a plumb bob. The device is adjustable in such a way that measurements can be made along the length of the pipe, or in a direction perpendicular to the longitudinal axis of the pipe, or in any other direction.

The main body of the device includes a finger operated lock mechanism to securely hold it in place when attached to a pipe. Two holes are provided in the main body located at right angles to each other. One hole extends completely through the main body and has square keyways located at each end. The other hole extends into, but not through, the main body. One end of a cylindrical rod is inserted into either hole, depending upon the direction of the measurement to be taken. The other end of the cylindrical rod includes a square key which mates with the keyways to prevent rotation of the cylindrical rod. The key includes a hole into which one end of a second cylindrical rod is inserted. The key also includes a lock mechanism to secure the second cylindrical rod into place. Attached to the other end of the second cylindrical rod is a bracket having a slot for receiving one end of a tape measure. The bracket is also provided with a pin which prevents the end of the tape measure from sliding out of the slot when it is extended or when a measurement is being taken.

An object of the invention is to permit a pipe or conduit installer to make measurements without the need for an assistant.

Another object of the invention is to provide for pipe or conduit measurements to be taken along the length of the pipe or conduit.

Another object of the invention is to provide for measurements to be taken in a direction perpendicular to a pipe or conduit.

Another object of the invention is to provide for measurements to be taken at any angle directed away from a pipe or conduit.

Another object of the invention is to permit an installer to make horizontal or vertical measurements of existing pipe or conduit installations.

Another object of the invention is to permit an installer to measure the distance from existing pipes or conduits installed in cramped spaces.

Another object of the invention is to provide for accurate direct measurement of pipe or conduit.

Another object of the invention is to provide a pipe measuring device which is hand-held and which can be easily carried and placed in the pocket of the installer.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
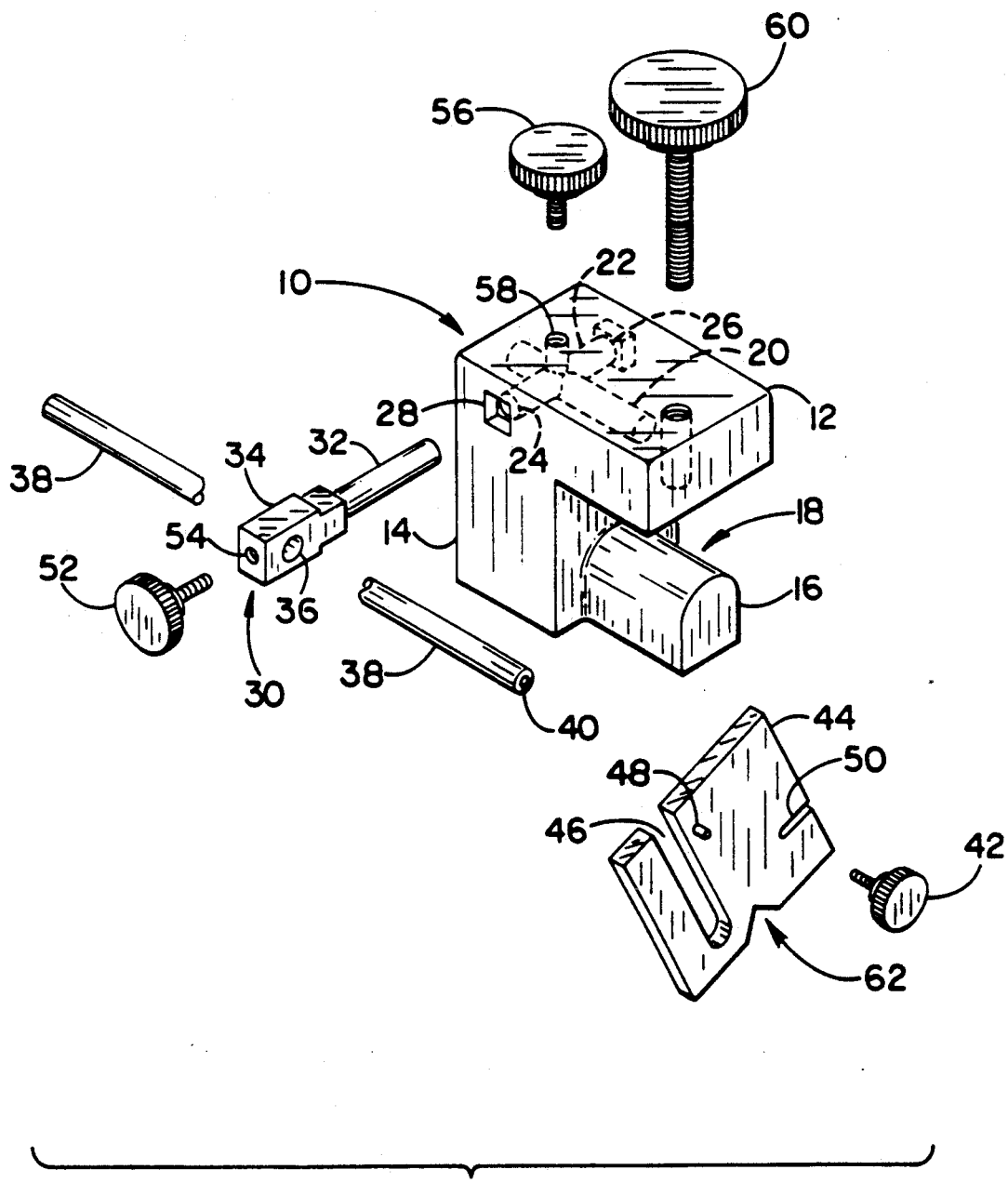
FIG. 1 is an exploded perspective view of the apparatus.

Referring more specifically to the drawings, for illustrative purposes the present invention is embodied in the apparatus generally shown in FIG. 1. It will be appreciated that the apparatus may vary as to configuration and as to details of the parts without departing from the basic concepts as disclosed herein.

Referring to FIG. 1, main body 10 includes first leg 12 and second leg 14 arranged in a generally "L" shaped configuration. Extending from second leg 14 is retention lobe 16 with a convex arcuate surface 18 which will be clamped against the interior wall of the conduit or coupling when a measurement is taken. First leg 12 includes first measurement port 20 and second measurement port 22 which intersect at right angles as shown. Second measurement port 22 extends completely through first leg 12, thereby creating entrance aperture 24 and exit aperture 26. Surrounding entrance aperture 24 and exit aperture 26 are square-shaped keyways 28.

Support arm 30 has a cylindrical shank 32 for insertion into first measurement port 20 or second measurement port 22, the port selected depending upon the direction of measurement to be taken. In most instances, measurements will be taken when shank 32 is inserted into second measurement port 22. Support arm 30 includes a key 34, one end of which includes a square taper positioned adjacent to the transition between shank 32 and key 34. When shank 32 is inserted into second measurement port 22 at either entrance aperture 24 or exit aperture 26, the square taper on key 34 seats in keyway 28 to prevent rotation.

Support arm 30 includes a receptacle 36 into which one end of rod 38 can be inserted. The other end of rod 38 includes a threaded hole 40 for insertion of threaded knob 42 and attachment of bracket 44. Bracket 44 includes a holding means, that is slot 46 positioned near one of its edges, slot 46 being of a size and configuration to accept one end of a conventional measuring tape inserted on its edge. When inserted, the measuring tape will extend perpendicular to the face of bracket 44 and the tab on the end of the measuring tape will rest against bracket 44. To prevent the measuring tape from accidentally sliding out of slot 46, bracket 44 includes retention pin 48 which will catch the tab on the end of the measuring tape when it slides.

Bracket 44 also includes slot 50, through which threaded knob 42 extends, and provides for removal of bracket 44 without the need to completely remove threaded knob 42. This permits the user to reverse the position of bracket 44, and thereby reposition slot 46 if necessary to make a measurement from a different position.

Rod 38 is locked into position with knob 52 which is inserted into threaded hole 54. Threaded hole 54 extends through key 34 and into receptacle 36 to clamp against rod 38. Support arm 30 is locked into position with knob 56 which is inserted into threaded hole 58. Threaded hole 58 extends through first leg 12 and into both first measurement port 20 and second measurement port 22 to clamp against shank 32. The entire apparatus is locked into place against a pipe or conduit, or a coupling therefor, by means of knob 60 which extends completely through first leg 12, the wall of the pipe or coupling being clamped by threaded knob 60 and retention lobe 16. Knobs 52, 56, and 60 are knurled knobs attached to threaded shafts as shown in FIG. 1.

Note that bracket 44 also includes notch 62 as a holding means which can be used for attachment of a string line and plumb bob if required.

Figure 2:
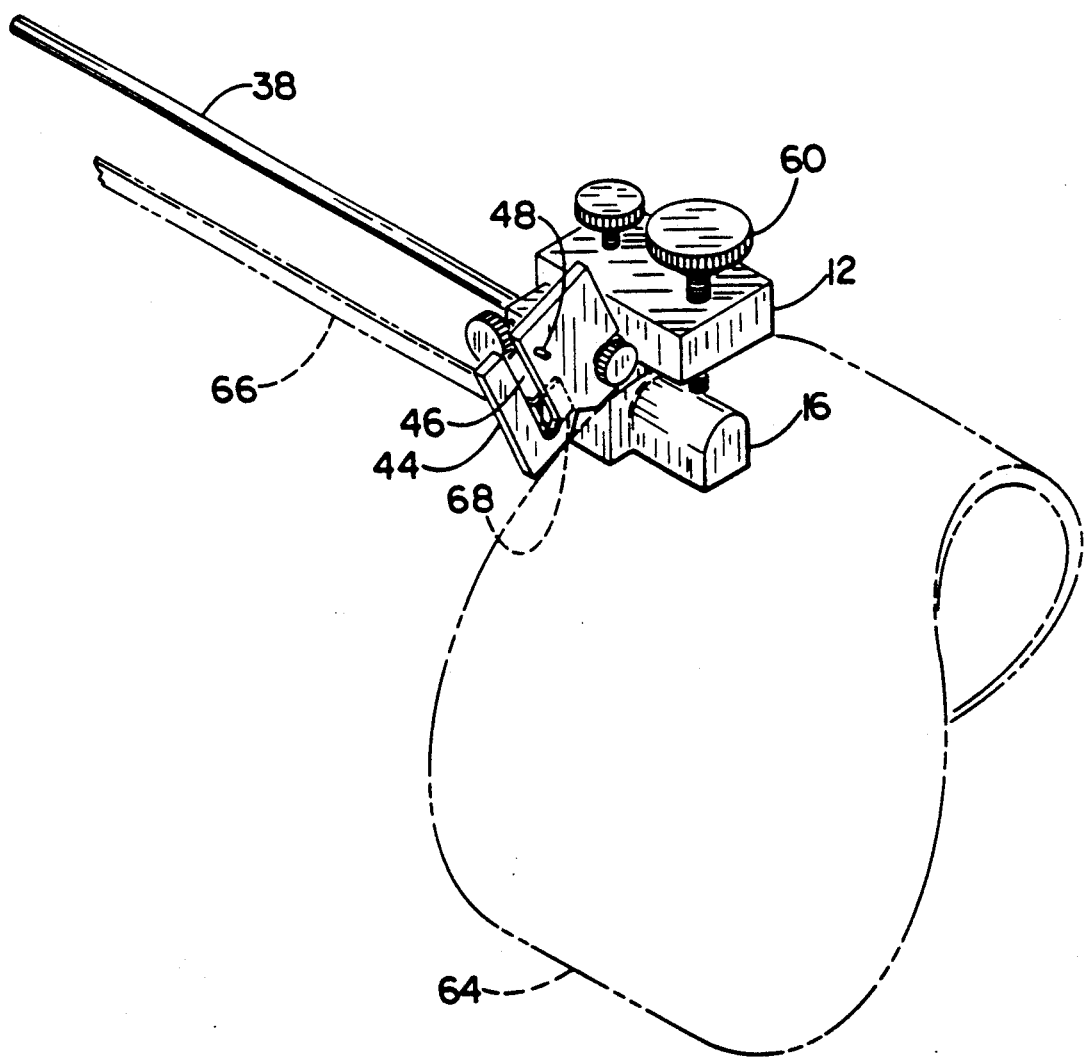
FIG. 2 is a perspective view of the apparatus attached to a conduit shown in phantom and a measuring tape shown in phantom.

FIG. 2 shows the apparatus attached to the end of a conduit 64 for a measurement from the edge of conduit 64 to some other location. In this configuration, the face of bracket 44 is positioned at the edge of conduit 64. Therefore, an exact measurement from the edge of conduit 64 can be made since the end of measuring tape 66 will be flush against the face of bracket 44 which is positioned at the edge of conduit 64. Tab 68 on measuring tape 66 is retained against the face of bracket 44 and will engage retention pin 48 if it begins to slide out of slot 46. If the user desired to make a measurement in a direction perpendicular to the length of the existing pipe, shank 32 would be rotated ninety degrees so that rod 38 is oriented vertically. The position of rod 38 in receptacle 36 would also be adjusted until bracket 44 is centered at the end of the conduit, so that the vertical measurement would be from the center of the conduit instead of the edge. Alternatively, if an angled measurement is required, rod 32 would be inserted into first measurement port 20 and rod 38 with bracket 44 oriented in the desired direction of measurement.

Figure 3:
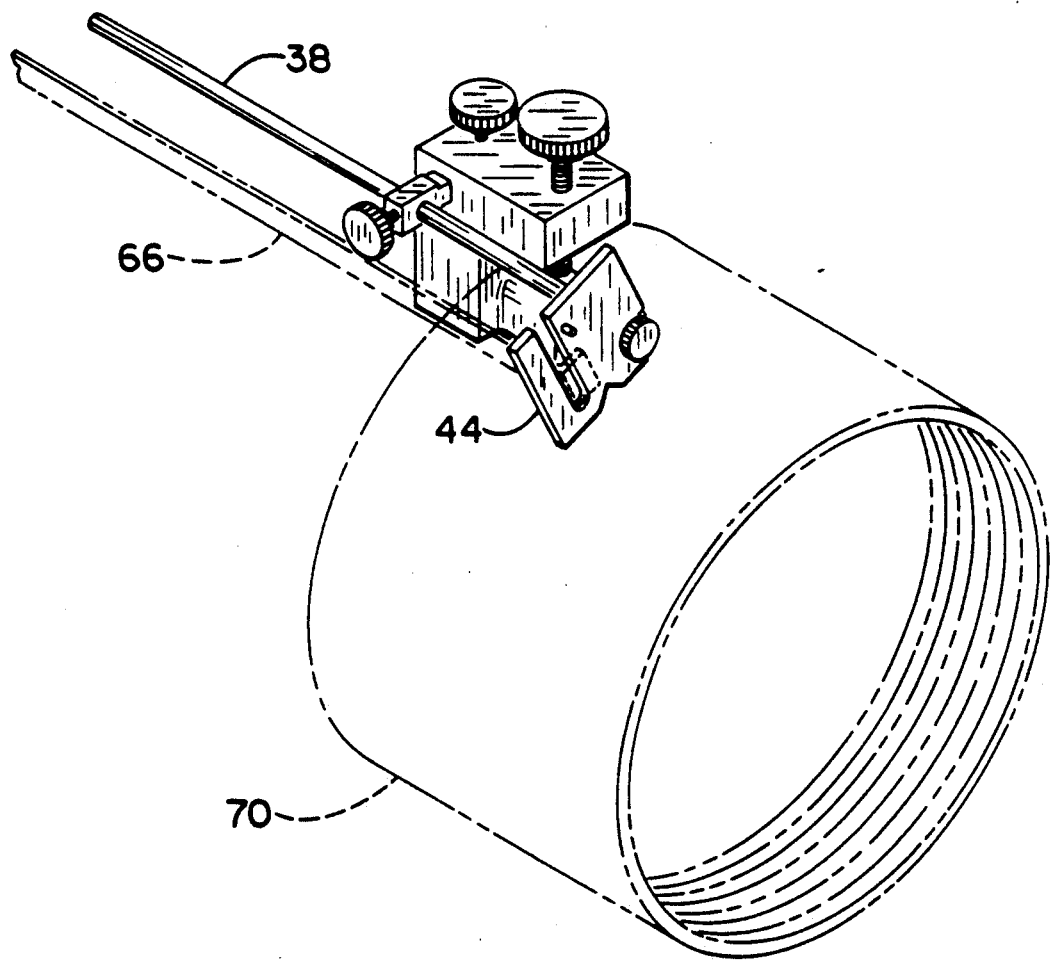
FIG. 3 is a perspective view of the apparatus attached to a conduit coupling shown in phantom and a measuring tape shown in phantom.
Figure 4:
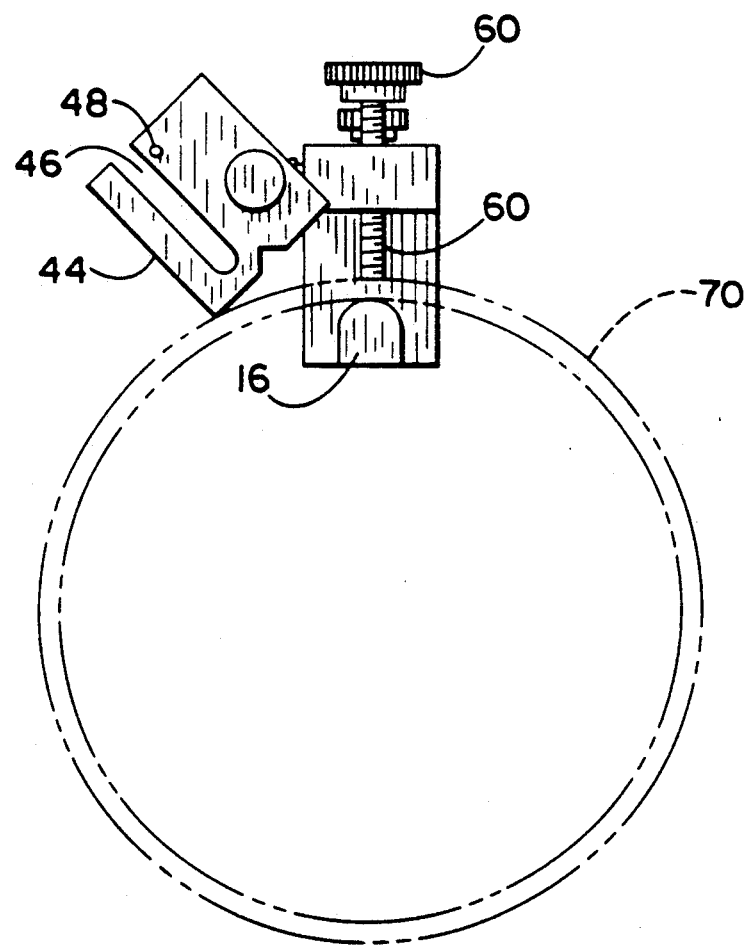
FIG. 4 is an end view of the conduit coupling of FIG. 3, showing the measuring tape bracket of the apparatus oriented tangentially against the surface of the coupling shown in phantom.

Referring also to FIG. 3 and FIG. 4, the apparatus can be used to take a measurement from a coupling 70 to some other location. Since a threaded conduit will be inserted into coupling 70, it is necessary to take the measurement from the point on the coupling where the conduit will bottom out. In this configuration, the apparatus is attached in the same manner as shown in FIG. 2, except that rod 38 is extended to position bracket 44 at the point on coupling 70 where the conduit will bottom out. As shown in FIG. 4, it is preferred that rod 38 be rotated until the lower corner of bracket 44 adjacent to slot 46 rests on coupling 70. This places the end of measuring tape 66 as close to the surface of coupling 70 as possible to give a more accurate measurement.

In any of the configurations shown in FIG. 2 through FIG. 4, the pipe or conduit might be installed against a wall or other surface. In order to take a measurement, measuring tape 66 must be positioned away from the wall. Therefore, depending upon whether the user is taking a measurement for a right hand or left hand run, shank 32 is inserted into either entrance aperture 24 or exit aperture 26 as required. Additionally, the position of bracket 44 can be reversed so that slot 46 can be oriented away from the wall and will always be on the side of body 10 which is away from the wall.

Figure 5:
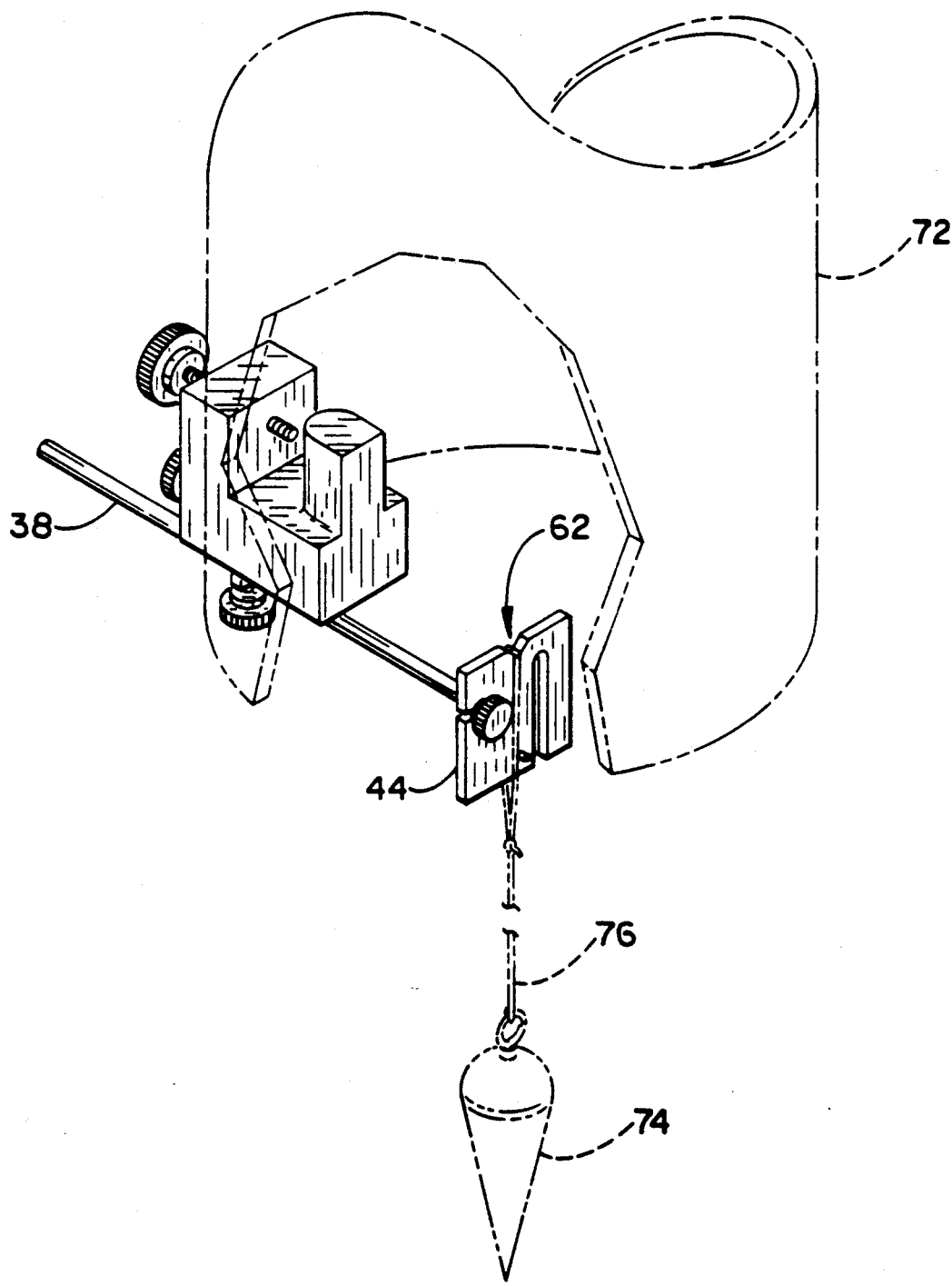
FIG. 5 is a perspective view of the apparatus attached to a vertically oriented conduit showing a plumb bob in phantom used to locate a center point.

Referring now to FIG. 5, the apparatus can also be used for determining the center projection of a vertically oriented conduit 72 over a floor or ground location by attaching a plumb bob 74 to a string line 76, tying string line 76 to bracket 44, and using notch 62 as a guide to center string line 76 in bracket 44. Rod 38 is extended to a point at which it is centered under conduit 72, and plumb bob 74 is used to mark the center position on the floor or ground. This is particularly useful where a hole must be cut in a floor for a continuing run of pipe or conduit and, therefore, the center projection of conduit 72 must be known.

The apparatus can be machined from light weight materials such as aluminum, teflon or the like, and can be conveniently carried in the user's pocket since it is both lightweight and small in size.

Accordingly, it will be seen that the present invention allows accurate measurements of lengths of pipes or conduits to be made without the installer requiring assistance of another person. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A pipe measuring and positioning apparatus, comprising:
    (a) a main body, said main body including a plurality of measurement ports;
    (b) pipe securing means for securing said main body to a pipe;
    (c) a support arm, said support arm having a first end and a second end, said first end for insertion into said measurement ports, said second end including a receptacle;
    (d) a bracket, said bracket including a holding means adapted to receive a measuring means;
    (e) a rod, said rod having a first end and a second end, said first end attached to said bracket, said second end for insertion into said receptacle; and
    (f) clamping means for securing said rod in said receptacle.

2. The apparatus as recited in claim 1, further comprising a retention pin, said retention pin attached to said bracket.

3. The apparatus as recited in claim 1, further comprising locking means for securing said support arm to said main body.

4. The apparatus as recited in claim 1, wherein said plurality of measurement ports includes a first measurement port extending through said main body to create an entrance aperture and an exit aperture.

5. The apparatus as recited in claim 4, further comprising a keyway located adjacent to said entrance aperture.

6. The apparatus as recited in claim 5, further comprising a threaded shaft, said threaded shaft engaging threads in said main body, said threaded shaft including a knob located at one end, the other end of said threaded shaft extending into said first measurement port.

7. The apparatus as recited in claim 6, further comprising a keyway located adjacent to said exit aperture.

8. The apparatus as recited in claim 4, wherein said plurality of measurement ports includes a second measurement port extending into said main body, said second measurement port being substantially perpendicular to said first measurement port, said second measurement port intersecting said first measurement port.

9. The apparatus as recited in claim 1, wherein said main body comprises:

(a) a first leg and a second leg, said first and second legs joined at their ends, said first and second legs being substantially perpendicular; and
    (b) a retention lobe, said retention lobe joined to said second leg, said retention lobe having an arcuate surface for abutment against the inner surface of said pipe.

10. The apparatus as recited in claim 1, wherein said pipe securing means comprises a threaded shaft, said threaded shaft engaging threads in said main body, said threaded shaft extending through said main body, said threaded shaft including a knob located at one end, the other end of said threaded shaft for engaging the surface of said pipe.

11. The apparatus as recited in claim 1, wherein said clamping means comprises a threaded shaft, said threaded shaft engaging threads in said second end of said support arm, said threaded shaft extending into said receptacle, said threaded shaft including a knob located at one end, the other end of said threaded shaft for engaging said rod.

12. The apparatus as recited in claim 1, wherein said rod includes a screw, said screw extending though said bracket, said screw engaging threads in said first end of said rod, said screw permitting removal of said bracket whereby the position of said bracket on said rod is reversible.

13. An apparatus for attaching a measuring means to a pipe, comprising:
    (a) a main body, said main body including a plurality of measurement ports;
    (b) a first threaded shaft, said first threaded shaft engaging threads in said main body, said first threaded shaft extending through said main body, said first threaded shaft including a knob located at one end, the other end of said first threaded shaft for engaging the outer surface of a pipe;
    (c) a support arm, said support arm having a first end and a second end, said first end for insertion into said measurement ports, said second end including a receptacle;
    (d) a bracket, said bracket including a holding means adapted to receive said measuring means;
    (e) a rod, said rod having a first end and a second end, said first end attached to said bracket, said second end for insertion into said receptacle;
    (f) a second threaded shaft, said second threaded shaft engaging threads in said second end of said support arm, said second threaded shaft extending into said receptacle, said second threaded shaft including a knob located at one end, the other end of said second threaded shaft for engaging said rod; and
    (g) a retention pin, said retention pin attached to said bracket.

14. The apparatus as recited in claim 13, wherein said plurality of measurement ports includes a first measurement port extending through said main body to create an entrance aperture and an exit aperture, said main body including a keyway located adjacent to said entrance aperture.

15. The apparatus as recited in claim 14, further comprising a keyway located adjacent to said exit aperture.

16. The apparatus as recited in claim 15, wherein said plurality of measurement ports includes a second measurement port extending into said main body, said second measurement port being substantially perpendicular to said first measurement port, said second measurement port intersecting said first measurement port.

17. The apparatus as recited in claim 16, further comprising locking means for securing said support arm to said main body.

18. The apparatus as recited in claim 17, wherein said locking means comprises a third threaded shaft, said third threaded shaft engaging threads in said main body, said third threaded shaft including a knob located at one end, the other end of said third threaded shaft extending into said first measurement port.

19. The apparatus as recited in claim 18, wherein said main body comprises:
   (a) a first leg and a second leg, said first and second legs joined at their ends, said first and second legs being substantially perpendicular; and
   (b) a retention lobe, said retention lobe joined to said second leg, said retention lobe having an arcuate surface for abutment against the inner surface of said pipe.

20. A pipe measuring apparatus for use with a measuring tape, comprising:
   (a) a main body, said main body having a first leg and a second leg, said first and second legs joined at their ends, said first and second legs being substantially perpendicular;
   (b) a first measurement port extending through said main body to create an entrance aperture and an exit aperture, said main body including keyways located adjacent to said entrance aperture and said exit aperture;
   (c) a second measurement port extending into said main body, said second measurement port being substantially perpendicular to said first measurement port, said second measurement port intersecting said first measurement port;
   (d) a retention lobe, said retention lobe joined to said second leg, said retention lobe having an arcuate surface for abutment against the inner surface of a pipe;
   (e) a first threaded shaft, said first threaded shaft engaging threads in said main body, said first threaded shaft extending through said main body, said first threaded shaft including a knob located at one end, the other end of said first threaded shaft for engaging the outer surface of said pipe;
   (f) a support arm, said support arm having a first end and a second end, said first end for insertion into said measurement ports, said second end including a receptacle;
   (g) a bracket, said bracket including a slot for attachment of one end of a measuring tape;
   (h) a rod, said rod having a first end and a second end, said first end attached to said bracket, said second end for insertion into said receptacle;
   (i) a second threaded shaft, said second threaded shaft engaging threads in said second end of said support arm, said second threaded shaft extending into said receptacle, said second threaded shaft including a knob located at one end, the other end of said second threaded shaft for engaging said rod;
   (j) a third threaded shaft, said third threaded shaft engaging threads in said main body, said third threaded shaft including a knob located at one end, the other end of said third threaded shaft extending into said first measurement port; and
   (k) a retention pin, said retention pin attached to said bracket in proximity to said slot.

* * * * *